United States Patent [19]

Schmitt

[11] Patent Number: 4,628,201

[45] Date of Patent: Dec. 9, 1986

[54] SCANNING SIGNAL BALANCING CIRCUIT

[75] Inventor: Walter Schmitt, Traunreut, Fed. Rep. of Germany

[73] Assignee: Dr. Johannes Heidenhain GmbH, Traunreut, Fed. Rep. of Germany

[21] Appl. No.: 583,768

[22] Filed: Feb. 27, 1984

[30] Foreign Application Priority Data

Mar. 5, 1983 [DE] Fed. Rep. of Germany ....... 3307931

[51] Int. Cl.$^4$ .......................... A45B 3/08; H01J 40/14
[52] U.S. Cl. .............................. 250/237 G; 33/125 A; 356/374; 307/311
[58] Field of Search ....................... 250/237 G, 214 C; 33/125 A, 125 C; 356/374; 307/311, 296 R, 362

[56] References Cited

U.S. PATENT DOCUMENTS

| 3,340,427 | 9/1967 | Bisso | 307/311 |
| 3,427,463 | 2/1969 | Weyrauch | 250/237 G |
| 4,225,931 | 9/1980 | Schwefel | . |
| 4,385,836 | 5/1983 | Schmitt | 250/214 C |

FOREIGN PATENT DOCUMENTS

| 2729697 | 7/1977 | Fed. Rep. of Germany . |
| 2818742 | 11/1978 | Fed. Rep. of Germany . |
| 3007311 | 10/1981 | Fed. Rep. of Germany . |

Primary Examiner—Edward P. Westin
Assistant Examiner—Stephone Allen
Attorney, Agent, or Firm—Willian Brinks Olds Hofer Gilson & Lione Ltd.

[57] ABSTRACT

A digital electric length or angle measuring system includes a scanning unit for scanning a measuring scale and an evaluating circuit for evaluating scanning units generated by a plurality of scanning elements of the scanning unit. The scanning elements are connected to differential amplifiers included in the evaluating circuit. In order to balance faulty signal parameters of the scanning signals of the scanning elements, a balancing circuit is provided which includes bridge circuits. In each case, one diagonal of the bridge circuit is circuited in parallel to the scanning elements in the scanning unit and is connected to the inputs of the differential amplifier of the evaluating arrangement. Furthermore, each of the bridge circuits includes at least one balancing element such as a photosensor.

13 Claims, 10 Drawing Figures

SCANNING SIGNAL BALANCING CIRCUIT

BACKGROUND OF THE INVENTION

The present invention relates to a balancing circuit for use with a digital length or angle measuring system of the type which includes a measuring scale, a scanning unit including at least one scanning element positioned to scan the scale and to generate in response thereto a scanning signal, and an evaluating circuit coupled to the at least one scanning element to evaluate the scanning signal.

Length or angle measuring systems which include arrangements for balancing or correcting faulty signal parameters of scanning signals are known to the art. Such signal parameters which may require balancing include, for example, symmetry, amplitude, and phase angle.

In German DE-OS No. 27 29 697, there is described a measuring system which includes a correction arrangement for the correction of faulty signal parameters of scanning signals which are to be interpolated. Deviations in the desired signal parameters are stored as digital correction values in a memory, and a computer utilizes these stored digital correction values to correct digitized scanning signals prior to interpolation. This correction system is relatively complicated in structure and use, and it requires the use of a computer and a memory which are not always available in length or angle measuring systems.

German DE-OS No. 28 18 742 describes a length measuring system in which a scanning unit generates two scanning signals which are phase shifted with respect to one another. In order to allow adjustment of the desired mutual phase shift between the scanning signals, one scanning signal is applied to a first input of an amplifier mixing stage. The second input of this amplifier receives a regulating voltage which is derived from the other scanning signal and is adjustable by means of an operational amplifier and a potentiometer. This arrangement is suited only for balancing the phase relationship between the two scanning signals and it requires the use of an amplifying element in the form of an operational amplifier.

German DE-OS No. 30 07 311 discloses a length or angle measuring system in which at least one pair of opposed phase photosensors is provided for generating scanning signals. These photosensors are connected in an anti-parallel arrangement to a pulse forming stage of an external evaluating arrangement. A constant balancing signal is applied to the circuit of the photo elements in the scanning unit in order to allow symmetry balancing of the counterphase scanning signals. In this system, only the symmetry of opposed phased scanning signals can be balanced. Furthermore, the symmetry balancing occurs only in one direction.

SUMMARY OF THE INVENTION

The present invention is directed to a length or angle measuring system of the type described initially above which includes a balancing arrangement which requires only simple, inexpensive components to provide bipolar balancing of all three of the signal parameters described above.

According to this invention, a digital position measuring system, of the type described initially above, is provided with a balancing circuit coupled to the measuring system and comprising at least one bridge circuit. At least one balancing element is included in the bridge circuit for balancing at least one faulty signal parameter of the scanning signal. The bridge circuit defines a pair of diagonal nodes which are circuited in parallel with the at least one scanning element of the scanning unit.

The present invention provides important advantages in terms of a remarkably simple balancing arrangement which requires only non-amplifying components such as resistors and photosensitive elements in the scanning unit. Furthermore, the present invention can be used to provide bipolar balancing in both directions simply by adjusting a single potentiometer. The balancing performed by the preferred embodiments of this invention is not disturbed even in the event the external evaluation arrangement must be exchanged. In the preferred embodiment described below, the symmetry, the amplitude ratio, and the desired phase angle of the scanning signals can all be balanced successively in the scanning unit. In this balancing, the degree of modulation of individual scanning signals remains largely unaffected. Further advantageous features of this invention are set forth in the dependent claims.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
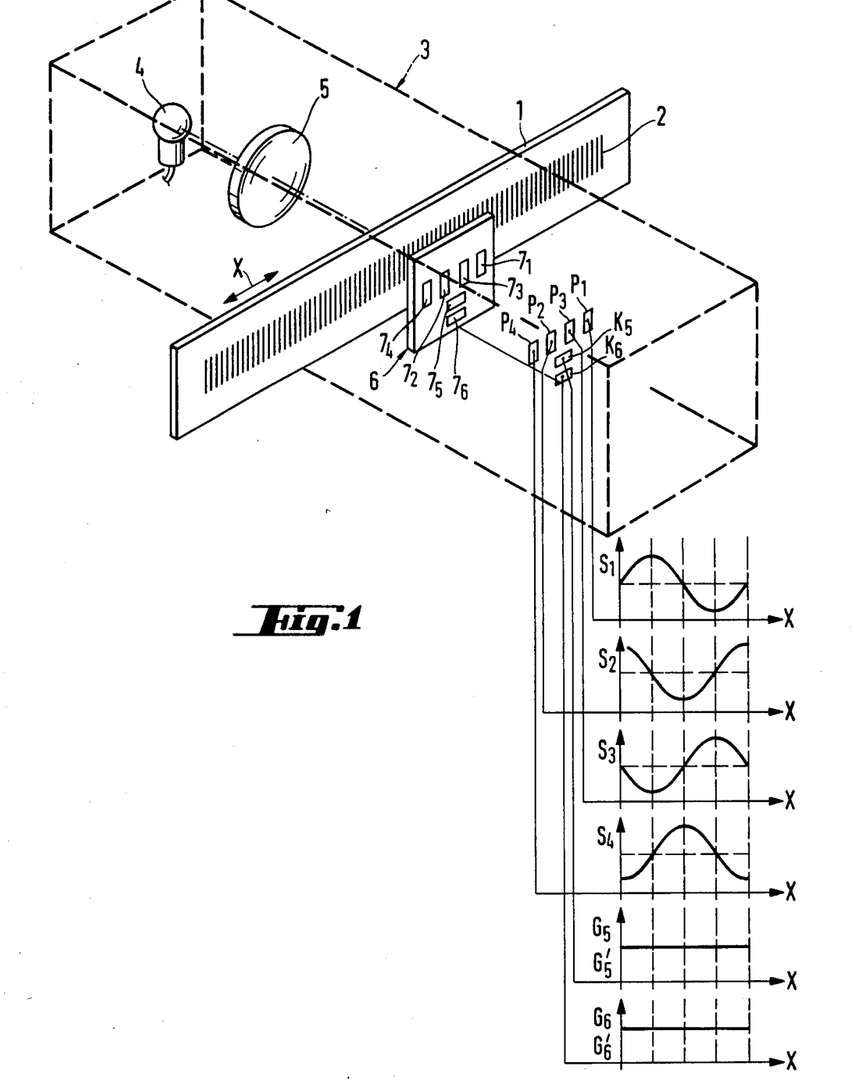
FIG. 1 is a schematic representation of a digital photoelectric length measuring system which incorporates a presently preferred embodiment of this invention.

Turning now to the drawings, FIG. 1 is a schematic representation of a digital photoelectric incremental length measuring system. This system includes a longitudinally shiftable scale 1 which is shiftable in the measuring direction X. For example, this scale 1 may be connected (in a manner not shown) with the slide piece of a machine tool. The measuring scale 1 serves as a carrier for an incremental graduation 2. This graduation 2 is scanned by a scanning unit 3 which may be fastened to the bed of the machine tool. The scanning unit 3 includes an incandescent lamp 4, a condensing lens 5, and a scanning plate 6. The scanning plate 6 defines four scanning fields $7_1$–$7_4$ for scanning the incremental graduation 2, and the scanning unit 3 includes four photosensors $P_1$–$P_4$ which are aligned with respective ones of the scanning fields $7_1$–$7_4$.

Each of the scanning fields $7_1$–$7_4$ includes a graduation or an array of lines (not shown) which match the incremental graduation 2 of the measuring scale 1. The graduations of the scanning fields $7_1$–$7_4$ are offset with respect to one another by a quarter of a graduation period of the graduation 2, i.e., by a phase angle of 90°.

When the measuring scale 1 moves relative to the scanning unit 3, the scanning photosensors $P_1$–$P_4$ generate correspondingly periodic scanning signals $S_1$–$S_4$ which are likewise offset with respect to one another by a phase angle of 90° as shown in FIG. 1.

The scanning signals $S_1$–$S_4$ are characterized by a direct current component or DC offset. That is, the scanning signals $S_1$–$S_4$ are not symmetrical with respect to the zero current or zero voltage line defined by the X axes in FIG. 1. In order to eliminate these direct current components of the scanning signals $S_1$–$S_4$, the photosensors $P_1$, $P_3$ are circuited antiparallel to one another, as are the photosensors $P_2$, $P_4$. See FIG. 2. In this way, two difference signals $D_O = S_1 - S_3$ (phase position 0°) and $D_{90} = S_2 - S_4$ (phase position 90°) are generated. These two difference signals $D_O$, $D_{90}$ are symmetrical with respect to the zero voltage or zero current state defined by the X axes of FIG. 1. Thus, the difference signals $D_O$, $D_{90}$ are symmetrical with respect to the abscissas X of FIG. 1 and they are phase shifted with respect to one another by a phase displacement of 90°. The difference signals $D_O$, $D_{90}$ are automatically compensated for signal level fluctuations arising from variations of the brightness of the lamp 4, since the difference signals $D_O$, $D_{90}$ are generated as a difference of two scanning signals $S_1$, $S_3$ and $S_2$, $S_4$. For this reason, the zero crossing of the difference signals $D_O$, $D_{90}$ can be used for exact triggering in an evaluating unit W. The phase displacement of 90° between the two difference signals $D_O$, $D_{90}$ permits a clear discrimination of the direction of movement of the scale 1 with respect to the scanning unit 3.

As a practical matter, commercially available photosensors differ in general one to another with respect to their electrical characteristics. That is, nominally identical photosensors will generate scanning signals with differing direct voltage components. For this reason, the scanning signals $S_1$–$S_4$ must be balanced for symmetry if the difference signals $D_O$, $D_{90}$ obtained by difference formation are to be symmetrical with respect to the zero voltage state. That is, the direct voltage components (the DC offset) of the scanning signals $S_1$ and $S_3$ must be equal to one another, as must be the direct voltage components of the scanning signals $S_2$ and $S_4$. Furthermore, since the difference signals $D_O$, $D_{90}$ can differ from one another with respect to their amplitudes and with respect to the required reciprocal phase position of 90°, the mutual amplitude ratio between the difference signals $D_O$, $D_{90}$ and the phase displacement between the difference signals $D_O$, $D_{90}$ must be balanced as well. The precise balancing of these signal parameters of symmetry, amplitude, and phase angle is particularly important if interpolation values with high subdivision factors are to be formed within a single period of the scanning signals.

Figure 2:
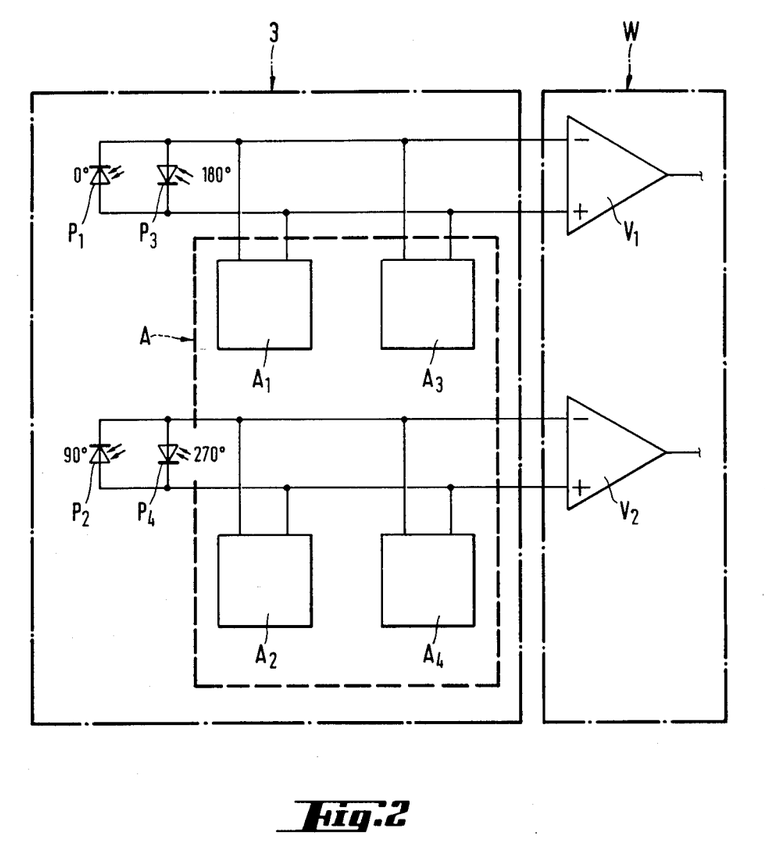
FIG. 2 is a schematic diagram of the balancing circuit of the embodiment of FIG. 1.

FIG. 2 presents a schematic diagram of the circuitry included in the embodiment of FIG. 1. This circuitry includes a balancing circuit A for balancing the signal parameters of symmetry, amplitude, and phase angle described above. As shown in FIG. 2, the scanning photosensors $P_1$, $P_3$ are circuited antiparallel to one another between the two inputs of a differential amplifier $V_1$. Similarly, the scanning photosensors $P_2$, $P_4$ are circuited antiparallel to one another between the two inputs of a differential amplifier $V_2$. The differential amplifiers $V_1$, $V_2$ are included in an external evaluating arrangement W which is spatially separate from the scanning unit 3. The balancing circuit A includes a balancing circuit $A_1$ for balancing the scanning signals $S_1$, $S_3$ with respect to symmetry or DC offset, a balancing circuit $A_2$ for balancing the scanning signals $S_2$, $S_4$ with respect to symmetry or DC offset, a balancing circuit $A_3$ for balancing the required phase angle between the difference signals $D_O$, $D_{90}$, and a balancing circuit $A_4$ for balancing the amplitude ratio of the two difference signals $D_O$, $D_{90}$. The circuits of FIGS. 3A–3D, 4A–4B, and 5A–5B illustrate two alternative circuits that can be used for the balance circuits $A_1$–$A_4$ of FIG. 2.

Figure 3A:
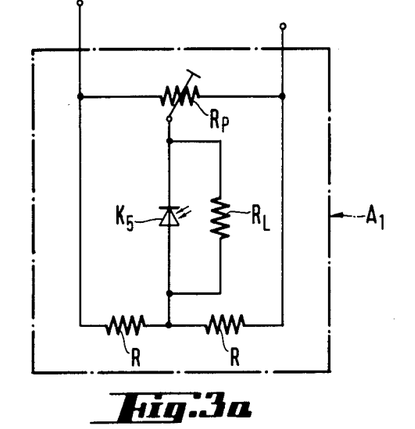
FIGS. 3A through 3D are four schematic diagrams of balancing circuits suitable for balancing the symmetry of the scanning signals in the circuit of FIG. 2.

As shown in FIG. 3A, the balancing circuit $A_1$ for balancing the symmetry of the scanning signals $S_1$, $S_3$ may include a four node resistance bridge. In the embodiment of FIG. 3A, the two terminals of the photosensor $K_5$ define a first pair of diagonal nodes of the resistance bridge, and the outputs of the balancing circuit $A_1$ define a second pair of diagonal nodes of the resistance bridge. Thus, in this embodiment, the first diagonal of the resistance bridge includes the balancing photosensor $K_5$ and a resistor $R_L$ which is circuited in parallel with the photosensor $K_5$. The second diagonal of the resistance bridge is connected via the outputs of the balancing circuit $A_1$ in parallel to the scanning photosensors $P_1$, $P_3$ with the inputs of the differential amplifier $V_1$ (FIG. 2). A scanning field $7_5$ on the scanning plate 6 of the scanning unit 3 is aligned with the balancing photosensor $K_5$ such that light from the lamp 4 passes through the scanning field $7_5$ onto the balancing photosensor $K_5$. The scanning field $7_5$ defines no graduation. Furthermore, light which passes through the scanning field $7_5$ onto the scanning element $K_5$ passes outside of the graduation 2 of the scale 1 and is therefore not modulated. For this reason, the balancing signal $G_5$ generated by the balancing photosensor $K_5$ is a constant balancing signal, as shown in FIG. 1. The resistance bridge is made up of two resistors R and of a potentiometer $R_P$. By adjusting the potentiometer $R_P$ the scanning signals $S_1$, $S_3$ can be balanced in a bipolar manner for symmetry, i.e., to equalize the DC offsets or the direct voltage components of the scanning signals $S_1$, $S_3$.

Figure 3B:
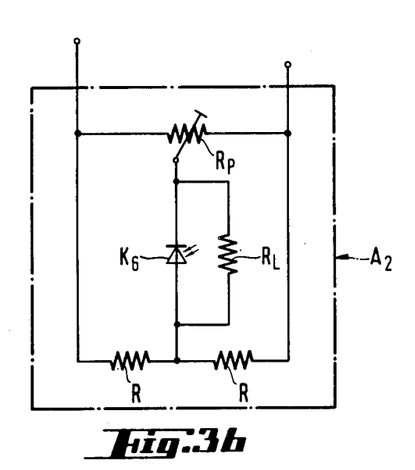
Figure 3C:
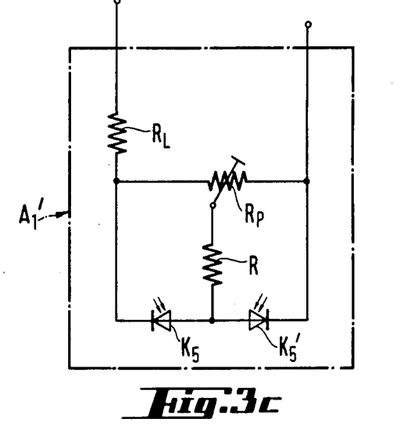
Figure 3D:
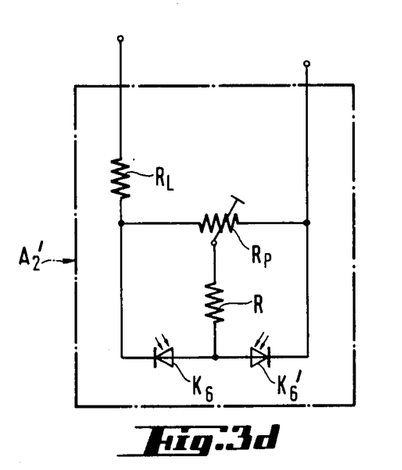

The balancing circuit $A_2$ shown in FIG. 3B for balancing the scanning signals $S_2$, $S_4$ with respect to symmetry corresponds substantially to the balancing circuit $A_1$ of FIG. 3A. Corresponding reference symbols are used for corresponding elements in FIGS. 3A and 3B. The first diagonal of the resistance bridge includes a balancing photosensor $K_6$ to which is allocated a scanning field $7_6$ on the scanning plate 6. The scanning field $7_6$ is not graduated. The second diagonal of the resistance bridge is connected via the outputs of the balancing circuit $A_2$ in parallel with the scanning photosensors $P_2$, $P_4$ with the inputs of the differential amplifier $V_2$ (FIG. 2). In a manner similar to that described above, the balancing photosensor $K_6$ is acted upon by the lamp 4 outside of the graduation 2 through the ungraduated scanning field $7_6$. Thus, the balancing photoelement $K_6$ is illuminated by unmodulated light and it generates a constant balance signal $G_6$ as shown in FIG. 1. By adjusting the potentiometer $R_P$, the scanning signals $S_2$, $S_4$ may be adjusted for symmetry in a bipolar manner in both directions.

Figure 4A:
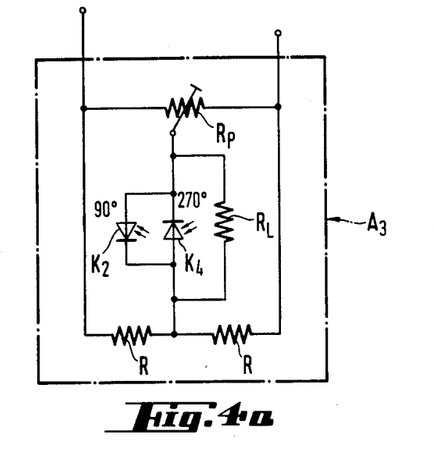
FIGS. 4A and 4B are two schematic diagrams of balancing circuits suitable for balancing the phase angle of the scanning signals in the circuit of FIG. 2.
Figure 4B:
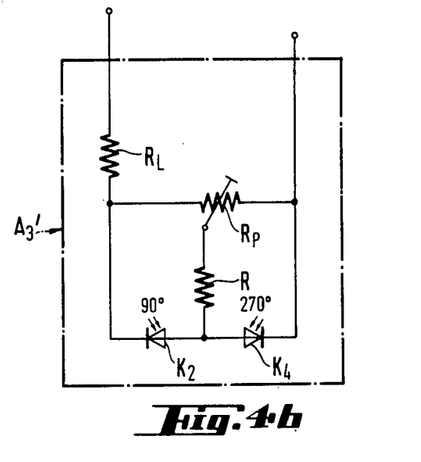

The balance circuit $A_3$ for balancing the required phase angle between the difference signals $D_O = S_1 - S_3$ and $D_{90} = S_2 - S_4$ is shown in FIG. 4A. The balancing circuit $A_3$ is similar in many ways to the balancing circuit $A_1$ of FIG. 3A and corresponding elements are identified by corresponding reference symbols. The first diagonal of the resistance bridge of the balancing circuit $A_3$ includes two antiparallel switched balancing photosensors $K_2$, $K_4$. Each of these balancing photosensors $K_2$, $K_4$ is aligned with a corresponding scanning field (not shown) on the scanning plate 6. The graduations of these scanning fields are identical to the graduations of the graduation 2 of the scale 1. The second diagonal of the resistance bridge is connected via the outputs of the balancing circuit $A_3$ in parallel with the scanning photosensors $P_1$, $P_3$ to the inputs of the differential amplifier $V_1$ (FIG. 2). Light passing from the lamp 4 is modulated in passing through the graduation 2 of the scale 1 and the graduations of the corresponding scanning fields prior to illuminating the balancing photosensors $K_2$, $K_4$. The balance signal $G_2$ generated by the balancing photosensor $K_2$ corresponds in its wave form to the scanning signal $S_2$ and is phase shifted with respect to the scanning signal $S_1$ by 90°. The balancing signal $G_4$ generated by the balancing photosensor $K_4$ corresponds in its wave form to the scanning signal $S_4$ and is phase shifted by 90° with respect to the scanning signal $S_3$. The two balancing photosensors $K_2$, $K_4$ therefor generate a difference balancing signal $G_{90} = G_2 - G_4$ with a phase shift of 90° with respect to the difference signal $D_O = S_1 - S_3$ to be balanced. By adjusting the potentiometer $R_P$ the required phase position of 90° of the difference signal $D_O$ with respect to the difference signal $D_{90}$ may be balanced in a bipolar manner.

Figure 5A:
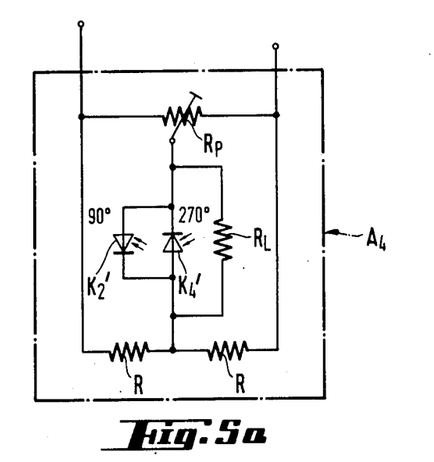
FIGS. 5A and 5B are two schematic diagrams of balancing circuits suitable for balancing the amplitude ratio of the scanning signals in the circuit of FIG. 2.
Figure 5B:
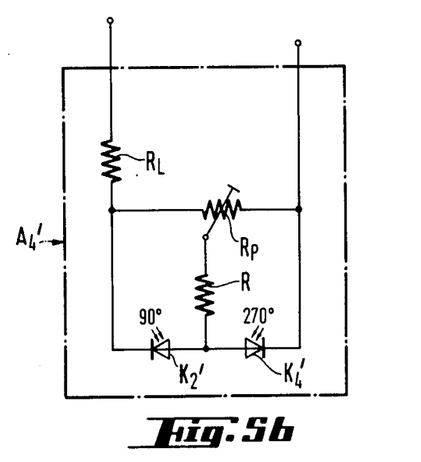

The balancing circuit $A_4$ shown in FIG. 5A operates to balance the amplitude ratio of the difference signals $D_O$, $D_{90}$. The balancing circuit $A_4$ corresponds substantially to the balancing circuit $A_1$ shown in FIG. 3A and like reference symbols are used for like components.

The first diagonal of the resistance bridge of FIG. 5A includes two antiparallel switched balancing photosensors $K_2'$, $K_4'$, not shown) there are allocated respective scanning fields on the scanning plate 6. These scanning fields define graduations which are identical with the graduation 2 of the scale 1. The second diagonal of the resistance bridge of FIG. 5A is connected via the outputs of the balancing circuit $A_4$ in parallel with the scanning photosensors $P_2$, $P_4$ with the inputs of the differential amplifier $V_2$ (FIG. 2). Light emanating from the lamp 4 is modulated on passing through the graduation 2 of the scale 1 and the graduations of the corresponding scanning fields prior to impinging upon the balancing photosensors $K_2'$, $K_4'$. The balancing signal $G_2'$ generated by the balancing photosensor $K_2'$ corresponds in its phase position to the scanning signal $S_2$, and the balancing signal $G_4'$ generated by the balancing photosensor $K_4'$ corresponds in its phase position to the scanning signal $S_4$. The balancing photosensors $K_2'$, $K_4'$, accordingly generate a combined difference signal $G_{90}' = G_2' - G_4'$. The phase position of this difference signal $G_{90}'$ corresponds with the difference signal $D_{90} = S_2 - S_4$ to be set in. By adjusting the potentiometer $R_P$, a bipolar balancing of the amplitude of the difference signal $D_{90}$ with respect to the amplitude of the difference signal $D_O$ is obtained.

FIGS. 3C, 3D, 4B and 5B are schematic diagrams of balancing circuits $A_1'-A_4'$, respectively the functions of which correspond to those of the balancing circuits $A_1-A_4$, respectively. Each of these balancing circuits $A_1'-A_4'$ circuit, and in each case, the resistor R is included in the first diagonal and the resistor L is included in the second diagonal of the bridge circuit. In one side branch of the bridge circuit there is arranged the potentiometer $R_P$ and in the other side branch in each case the balancing elements $K_2$, $K_4$; $K_2'$, $K_5$, $K_5'$; $K_6$, $K_6'$. In each case, the balancing elements are circuited in series and in opposite polarity and permit, therefore, a monolithic arrangement. In contrast to the balancing circuits $A_1$, $A_2$, the balancing circuits $A_1'$, $A_2'$ require two similar balancing photosensors $K_5$, By illuminating the scanning photosensors $P_1-P_4$, and the balancing photosensors $K_2$, $K_4$; $K_2'$, $K_4'$; $K_5$, $K_5'$; $K_6$, $K_6'$ with the same light source 4, the balance of the signal parameters remains preserved even when the brightness of the light source 4 changes in time. Preferably, the signal parameter balancing is performed in the following order: first, amplitude balancing, then phase angle balancing, and finally symmetry balancing. This is because direct voltage constituents (DC offsets) which may be included in the balancing signals $G_2$, $G_4$; $G_2'$, $G_4'$ symmetry balance.

The difference signals $D_O$, $D_{90}$, balanced with respect to their signal parameters, are evaluated in the evaluating arrangement W and are then applied to a control or display circuit (not shown).

Of course, it should be understood that a wide range of changes and modifications can be made to the preferred embodiments described above. The invention is not limited to photoelectric measuring systems, but can readily be adapted for use in magnetic, inductive, or capacitive measuring systems. Furthermore, the balancing elements can be constructed as magnetic, inductive, or capacitive elements. It is therefore intended that the foregoing detailed description be regarded as illustrative rather than limiting, and that it be understood that it is the following claims, including all equivalents, which are intended to define the scope of this invention.

I claim:

1. In a digital position measuring system of the type comprising a measuring scale, a scanning unit including at least one scanning element positioned to scan the scale and to generate in response thereto a scanning signal, and an evaluating circuit coupled to the at least one scanning element to evaluate the scanning signal, the improvement comprising:
    a balancing circuit coupled to the measuring system and comprising:
        at least one bridge circuit; and
        at least one balancing element for balancing at least one signal parameter of the scanning signal, said balancing element included in the bridge circuit;
        said bridge circuit defining a first pair of diagonal nodes circuited parallel to the at least one scanning element in the scanning unit.

2. The invention of claim 1 wherein the balancing element generates a constant balancing signal and wherein the balancing circuit operates as means for balancing the scanning signal for DC offset.

3. The invention of claim 1 wherein the at least one scanning element comprises two scanning elements, each generating a respective scanning signal; wherein the at least one balancing element comprises two balancing elements, each generating a respective modulated balancing signal; wherein each of the modulated balancing signals is phase shifted by 90° with a respective one of the scanning signals; and wherein the balancing circuit operates as means for balancing the phase angle between the scanning signals.

4. The invention of claim 1 wherein the at least one scanning element comprises two scanning elements, each generating a respective scanning signal; wherein the at least one balancing element comprises two balancing elements, each generating a respective modulated balancing signal, wherein each of the balancing signals is equal in phase to a respective one of the scanning signals; and wherein the balancing circuit operates as means for balancing the amplitudes of the scanning signals.

5. The invention of claim 1 wherein each of the scanning elements and each of the balancing elements comprises a respective photosensitive element.

6. The invention of claim 5 wherein the invention further comprises a single light source arranged to illuminate both the scanning elements and the balancing elements.

7. The invention of claim 1 wherein each of the balancing elements comprises a respective magnetic element.

8. The invention of claim 1 wherein each of the balancing elements comprises a respective inductive element.

9. The invention of claim 1 wherein each of the balancing elements comprises a respective capacitive element.

10. The invention of claim 1 wherein the bridge circuit further comprises at least one adjustable resistor and at least one fixed resistor.

11. In a digital position measuring system of the type comprising a measuring scale, a scanning unit including at least one scanning element positioned to scan the scale and to generate in response thereto a scanning signal, and an evaluating circuit coupled to the at least one scanning element to evaluate the scanning signal, the improvement comprising:
   means for balancing at least one signal parameter, of the scanning signal, said balancing means comprising:
     a four node bridge circuit;
     means for connecting a first pair of diagonal nodes of the bridge circuit in parallel with the at least one scanning element; and
     at least one balancing element included in the bridge circuit, said balancing element operative to generate a balancing signal which is applied to the bridge circuit to correct the at least one signal parameter.

12. The invention of claim 11 wherein the at least one balancing element is connected across a second pair of diagonal nodes of the bridge circuit.

13. The invention of claim 11 wherein the at least one balancing element comprises first and second balancing elements; wherein the first balancing element is connected between a first one of the nodes and a second one of the nodes, adjacent to the first one of the nodes, and wherein the second balancing element is connected between the second one of the nodes and a third one of the nodes, adjacent to the second one of the nodes.

* * * * *

UNITED STATES PATENT AND TRADEMARK OFFICE
CERTIFICATE OF CORRECTION

PATENT NO. : 4,628,201

DATED : Dec. 9, 1986

INVENTOR(S) : Walter Schmitt

Page 1 of 2

It is certified that error appears in the above-identified patent and that said Letters Patent is hereby corrected as shown below:

In column 3, line 13, please end the sentence by inserting a period after "$P_4$";

In column 5, line 37, after "$K_4'$," please insert --to which (in a manner--;

In column 5, line 62, please insert a comma after "respectively";

In column 5, line 65, after "$A_1'-A_4'$" please insert --includes a bridge--;

In column 6, line 2, after "$K_2'$," please insert --$K_4'$--;

In column 6, line 6, please delete the italicized "$A2'$" before "require" and substitute therefor --$A_2'$--;

In column 6, line 7, after "$K_5$," please insert --$K_5'$; $K_6$, $K_6'$ in order to obtain bipolar balancing.--

UNITED STATES PATENT AND TRADEMARK OFFICE
CERTIFICATE OF CORRECTION

PATENT NO. : 4,628,201
DATED : Dec. 9, 1986
INVENTOR(S) : Walter Schmitt

Page 2 of 2

It is certified that error appears in the above-identified patent and that said Letters Patent is hereby corrected as shown below:

In Column 6, line 18, after "$G_4'$" please insert --can influence the--.

Signed and Sealed this

Nineteenth Day of April, 1988

Attest:

DONALD J. QUIGG

Attesting Officer

Commissioner of Patents and Trademarks